United States Patent
Ryu (10) Patent No.: US 7,149,902 B2
(45) Date of Patent: Dec. 12, 2006

(54) APPARATUS FOR AND METHOD OF SUPPLYING POWER WITH POWER SAVING FUNCTION

(75) Inventor: Han-chung Ryu, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 483 days.

(21) Appl. No.: 10/231,473

(22) Filed: Aug. 30, 2002

(65) Prior Publication Data

US 2003/0110405 A1    Jun. 12, 2003

(30) Foreign Application Priority Data

Dec. 10, 2001  (KR) .............................. 2001-77794

(51) Int. Cl.
*G06F 1/26* (2006.01)
(52) U.S. Cl. ...................... 713/300; 713/310; 713/324; 713/340
(58) Field of Classification Search ................ 713/300, 713/310, 324, 340
See application file for complete search history.

(56) References Cited

U.S. PATENT DOCUMENTS 5,483,464 A * 1/1996 Song .......................... 713/300
6,108,219 A * 8/2000 French ......................... 363/23
6,333,862 B1 * 12/2001 Lee et al. ................. 363/21.01
6,349,386 B1 * 2/2002 Chan .......................... 713/323
6,769,070 B1 * 7/2004 Kawata ....................... 713/324

FOREIGN PATENT DOCUMENTS

KR       1999-21039       3/1999

OTHER PUBLICATIONS

Barr, Michael. "Pulse Width Modulation", Embedded Systems Programming, Sep. 2001, pp. 103-104.*

* cited by examiner

*Primary Examiner*—Lynne H. Browne
*Assistant Examiner*—Tse Chen
(74) *Attorney, Agent, or Firm*—Staas & Halsey LLP (57) ABSTRACT

A power supplying apparatus having a power saving function and a method of supplying power with a power saving function. An auxiliary power generator generates auxiliary power in response to a cutoff signal. A main power generator senses the generation of the auxiliary power and generates main power in response to the sensed result and a first state of a control signal supplied by a set which performs an intrinsic function. Absent the power cutoff signal, the set performs the intrinsic function in response to the main power and stands by to perform the intrinsic function in response to the auxiliary power. A second state of the control signal places the power supplying apparatus in a power saving mode during which the set may communicate with another circuit. If the cutoff signal is supplied during performance of the intrinsic function, main power is sustained until the intrinsic function is completed.

32 Claims, 5 Drawing Sheets

APPARATUS FOR AND METHOD OF SUPPLYING POWER WITH POWER SAVING FUNCTION

CROSS-REFERENCE TO RELATED APPLICATIONS

This application claims the benefit of Korean Application No. 2001-77794 filed Dec. 10, 2001, in the Korean Industrial Property Office, the disclosure of which is incorporated herein by reference.

BACKGROUND OF THE INVENTION

1. Field of the Invention

The present invention relates to an apparatus for and a method of supplying power to a set, such as, for example, a printer, a multi-function peripheral, a facsimile, or a copier, and more particularly, to an apparatus for and a method of supplying power so that power may be saved according to conditions of the set.

2. Description of the Related Art

In the prior art, an alternating current (AC) switch is used to completely cut off power, which a power supplying apparatus supplies to a set, or a software unit is used to save power supplied to the set.

If the AC switch completely cuts off the supply of power, the set completely stops all operations. If the set is a facsimile, the set cannot receive externally supplied data where the supply of power is completely cut off. If the set is an inkjet printer, a head may not be parked at a correct position if the AC switch suddenly cuts off the supply of power to the set before the head is parked. As a result, ink discharged from the head may coagulate. In other words, if the AC switch is suddenly turned off while the set is performing a normal operation, the operation will be incomplete and canceled.

The conventional power supplying apparatus should always supply the software unit with a predetermined current to save power that is supplied to the set where the AC switch is turned on. In other words, since a predetermined power should be supplied to the software unit for the minimum operation of the software unit, it is impossible to effectively save power that is supplied to the set.

SUMMARY OF THE INVENTION

To solve the above-described problems, it is an object of the present invention to provide a power supplying apparatus with a power saving function by which an external user can directly control the supply of power without the assistance of a software unit or which itself supplies only minimum auxiliary power.

It is another object of the present invention to provide a method of supplying power using the power supplying apparatus.

Additional objects and advantages of the invention will be set forth in part in the description which follows, and, in part, will be obvious from the description, or may be learned by practice of the invention.

Accordingly, to achieve the above and other objects, there is provided an apparatus having a power saving function, for supplying power to a set which performs an intrinsic function. The apparatus comprises an auxiliary power generator and a main power generator. The auxiliary power generator generates auxiliary power for the set in response to a power cutoff signal. The main power generator senses the generation of the auxiliary power and generates main power in response to the sensed result and a control signal generated from the set based on an operational state of the set. A user inputs the power cutoff signal if the user wants to cut off the generation of the auxiliary power and the main power, and the set performs an intrinsic function in response to the main power and is ready to perform the intrinsic function in response to the auxiliary power.

To achieve the above and other objects, there is also provided a method of supplying power which is performed in the apparatus. The method comprises determining whether main power and auxiliary power are requested to be supplied from the power supplying apparatus to the set; generating and supplying auxiliary power to the set if it is determined that the supply of the main power and the auxiliary power is requested from the power supplying apparatus to the set; and generating and supplying the main power to the set.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Operation and configuration of a power supplying apparatus having a power saving function according to the present invention will be described with reference to FIG. 1.

Figure 1:
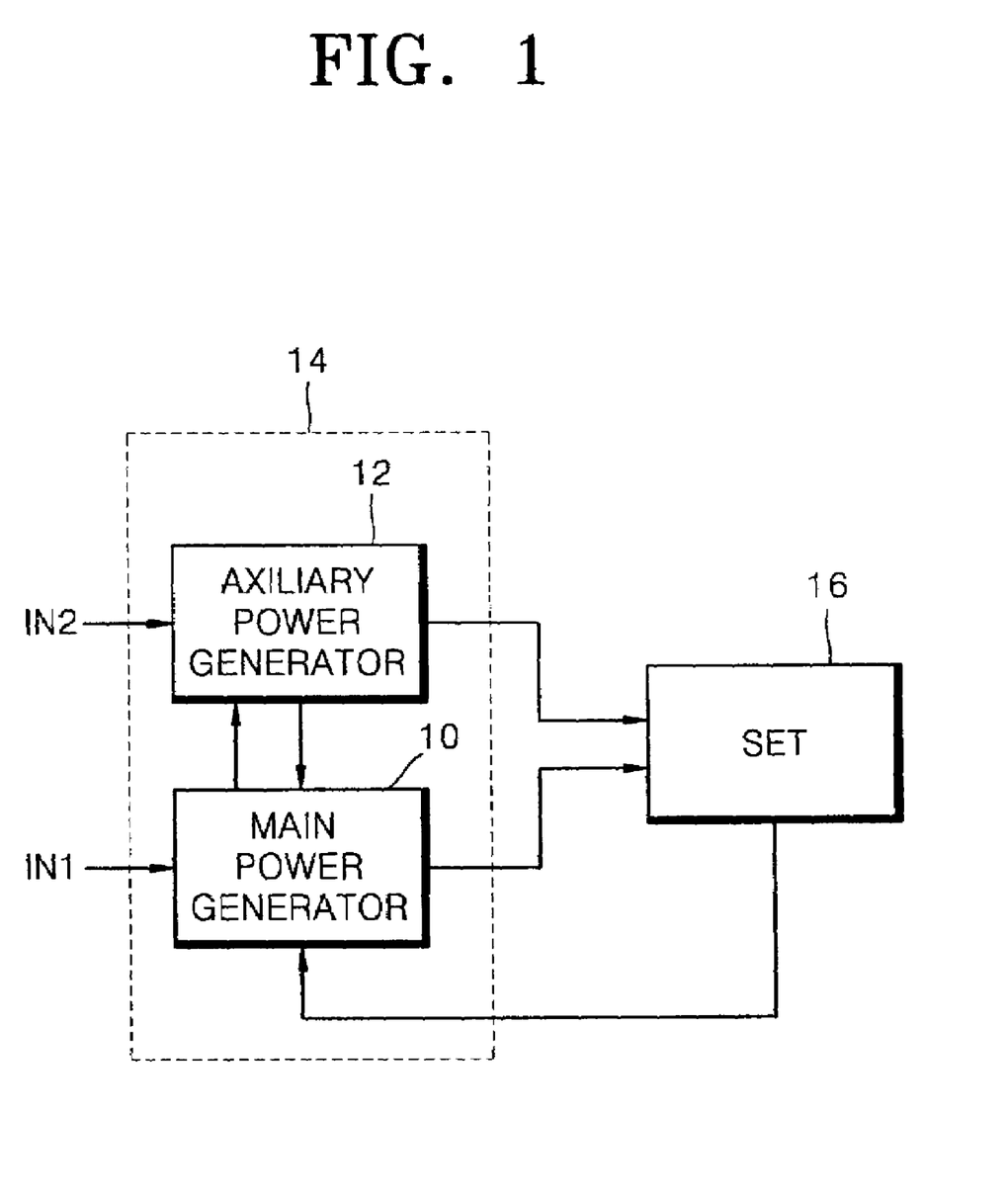
FIG. 1 is a block diagram of a power supplying apparatus having a power saving function.

FIG. 1 is a block diagram of a power supplying apparatus having a power saving function according to the present invention. A power supplying apparatus 14 of the present invention and a set 16 are shown in FIG. 1. The power supplying apparatus 14 includes a main power generator 10 and an auxiliary power generator 12.

The set 16 is driven by the power supplying apparatus 14 and performs an intrinsic function at any point of time, such as, for example, a function based on a command provided by a user, a command generated internally within the set, or a command provided by another device with which the set is in communication. The set 16 performs the intrinsic function in response to main power input from the main power generator 10 or is ready to perform the intrinsic function in response to auxiliary power input from the auxiliary power generator 12. The set 16 may be a computer peripheral device such as, for example, a printer, a facsimile, a digital copier, or a multi-function peripheral. If the set 16 is a printer, the intrinsic function of the set 16 represents a printing function. If the set 16 is a facsimile, the intrinsic function of the set 16 represents a function of transmitting and receiving data. If the set 16 is a digital copier, the intrinsic function of the set 16 represents a digital copying function. If the set 16 is a multi-function peripheral, the intrinsic function of the set 16 represents a combination of printing, data transmitting and receiving, and digital copying.

The main power generator 10 senses whether the auxiliary power generator 12 generates auxiliary power and supplies auxiliary power to the set 16 and then generates main power in response to the sensed result and a control signal input from the set 16. For example, if the main power generator 10 senses that auxiliary power is not generated even though the main power generator 10 receives a rated AC voltage via an input node IN1 from the outside, the main power generator 10 does not generate main power. However, if the main power generator 10 senses that auxiliary power is generated, the main power generator 10 generates main power in response to the control signal input from the set 16.

If the set 16 is to perform the intrinsic function, the set 16 outputs a control signal having a first logic level to the main power generator 10 so that the main power generator 10 generates main power. However, if the set 16 is not to perform the intrinsic function, the set 16 outputs a control signal having a second logic level that is complementary to the first logic level to the main power generator 10 so that the main power generator 10 does not generate main power. Also, if the set 16 completes the intrinsic function where auxiliary power is not generated, the set 16 may output the control signal having the second logic level to the main power generator 10 so that the main power generator 10 does not generate main power. Alternatively, the control signal may be an analog signal rather than a digital signal.

The auxiliary power generator 12 generates auxiliary power in response to a power cutoff signal input via an input node IN2 and outputs the auxiliary power to the set 16. The power cutoff signal may be initiated by a user. For example, the auxiliary power generator 12 does not generate auxiliary power if the auxiliary power generator 12 perceives that the external user does not want power to be supplied to the set 16 even though the auxiliary power generator 12 receives a direct current (DC) voltage from the main power generator 10. In other words, the user controls the generation of auxiliary power and main power and the supply of the auxiliary power and main power to the set 16 using the power cutoff signal.

A method of supplying power according to the present invention using the power supplying apparatus shown in FIG. 1 will be described with reference to FIG. 2.

Figure 2:
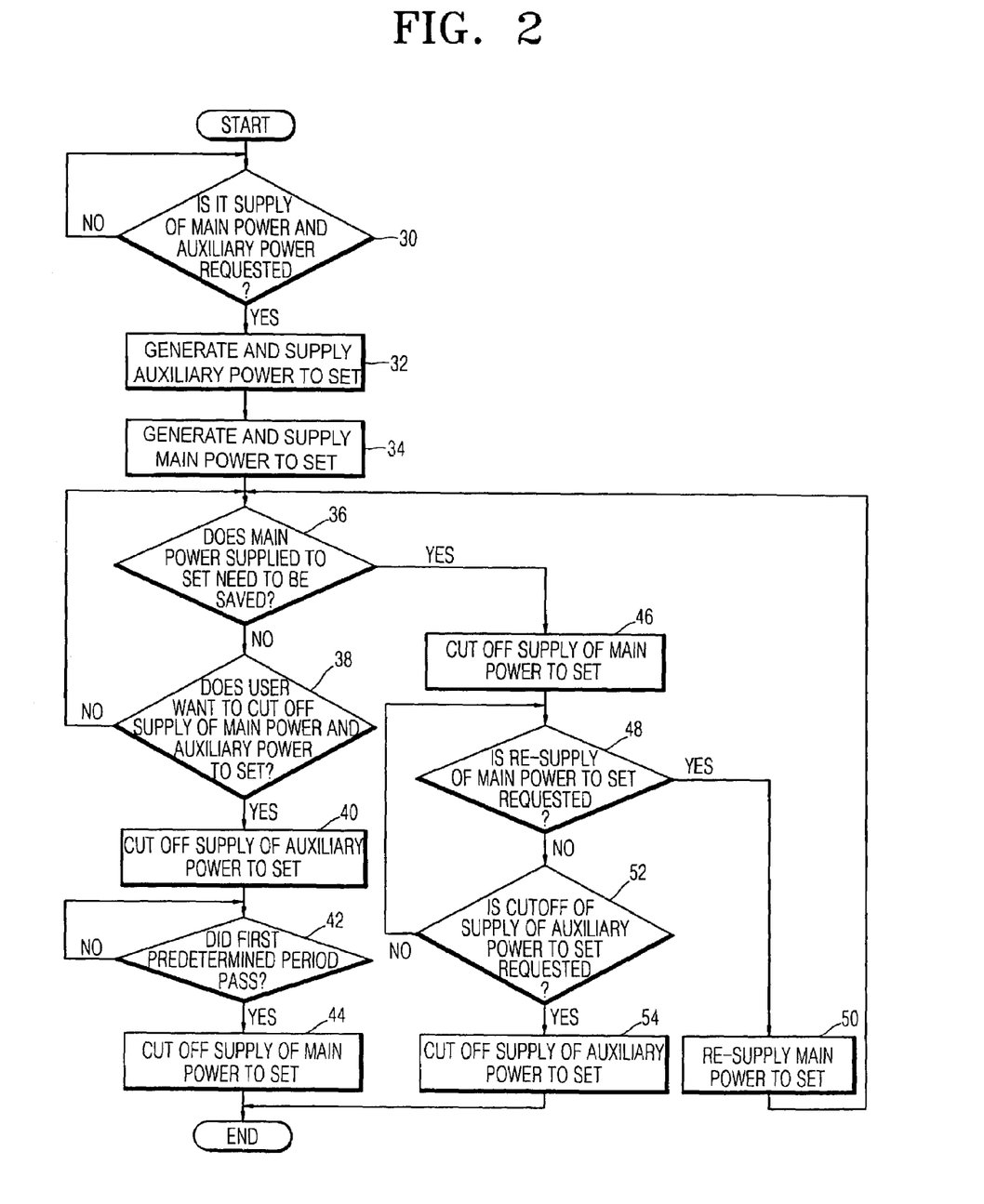
FIG. 2 is a flowchart for explaining a method of supplying power, which is performed in the power supplying apparatus shown in FIG. 1.

FIG. 2 is a flowchart for explaining a method of supplying power performed in the power supplying apparatus 14 shown in FIG. 1, according to the present invention. The method comprises operations 30, 32, and 34 which are related to going from a cutoff mode into a normal mode, operations 36, 38, 40, 42, 44, and 46 which are related to going from the normal mode into a power saving mode or the cutoff mode, operations 48, 52, and 54 which are related to returning from the power saving mode to the normal mode or going into the cutoff mode. The cutoff mode means that the power supplying apparatus 14 shown in FIG. 1 does not supply main power or auxiliary power to the set 16. The normal mode means that the power supplying apparatus 14 supplies main power and auxiliary power to the set 16. The power saving mode means that the power supplying apparatus 14 supplies only auxiliary power to the set 16.

The power supplying apparatus 14 shown in FIG. 1 goes from the cuoff mode into the normal mode in operations 30, 32, and 34 as described below.

The power supplying apparatus 14 continuously determines whether the user requests the supply of the main power and the auxiliary power to the set 16 in operation 30. The power supplying apparatus 14 determines whether the user wants the supply of main power and auxiliary power from the power supplying apparatus 14 to the set 16 based on whether a rated AC voltage is input via the input node IN1 and whether the power cutoff signal is input via the input node IN2 from the external user.

If It is determined that the user requests the supply of main power and auxiliary power from the power supplying apparatus 14 to the set 16, auxiliary power is generated and supplied to the set 16 in operation 32. For example, if the auxiliary power generator 12 of the power supplying apparatus 14 senses that the user wants the main power and auxiliary power to be supplied to the set 16, the auxiliary power generator 12 generates auxiliary power and outputs the auxiliary power to the set 16.

After operation 32, when the auxiliary power generator 12 generates auxiliary power, the main power generator 10 generates main power and outputs the main power to the set 16 in operation 34. Finally, in the method of supplying power according to the present invention, auxiliary power is generated and then main power is generated when the power supplying apparatus goes from the cutoff mode into the normal mode.

After generating and supplying main power to the set at operation 34, the power supplying apparatus 14 determines whether the power supplying apparatus 14 goes from the normal mode to the cutoff mode or the power saving mode or maintains the normal mode in operations 36 and 38.

For example, after operation 34, the power supplying apparatus 14 determines whether main power supplied to the set 16 needs to be saved, e.g., be cut off in operation 36. For this, the main power generator 10 determines whether a control signal that requests the cutoff of the supply of main power is input from the set 16. If it is determined that main power supplied to the set 16 does not need to be saved, the power supplying apparatus 14 determines whether the user requests the cutoff of the supply of main power and auxiliary power to the set 16 in operation 38. In operation 38 the auxiliary power generator 12 analyzes the power cutoff signal input via the input node IN2. If it is determined that the user did not request the cutoff of the supply of main power and auxiliary power to the set 16, the normal mode is maintained and operation 36 repeated. In other words, the power supplying apparatus 14 maintains the normal mode while operations 36 and 38 are repeated until a change from the normal mode is indicated.

The power supplying apparatus 14 goes from the normal mode into the cutoff mode according to operations 40, 42, and 44.

The power supplying apparatus 14 first cuts off the supply of auxiliary power to the set 16 in operation 40 if the power cutoff signal is input via the input node IN2.

After operation 40, it is determined whether a first predetermined period has passed in operation 42. The first predetermined period represents a period required for completion of the intrinsic function of the set 16. Also, the first predetermined period may include a period required for initializing the set 16. To perform operation 42, the set 16 determines whether the first predetermined period has passed. In other words, the main power generator 10 determines whether a control signal for informing that the first predetermined period is input from the set 16.

The set 16 may include a level sensor (not shown), a comparator (not shown), and a control signal generator (not shown) to generate the control signal required for performing operation 40. The level sensor senses a level of the auxiliary power generated in the auxiliary power generator 12 and the comparator compares the sensed level with a predetermined value. The control signal generator outputs the control signal to the main power generator 10 if the control signal generator senses that a completion signal for representing the completion of the intrinsic function of the set 16 is generated and auxiliary power is not generated, using the compared result input from the comparator.

The main power generator 10 cuts off the supply of main power to the set 16 in operation 44 if the main power generator 10 senses that the first predetermined period has passed using the control signal input from the set 16.

As described above, the power supplying apparatus according to the present invention cuts the supply of auxiliary power when the power supplying apparatus goes from the normal mode into the cutoff mode and then cuts the supply of main power when the first predetermined period has passed. Thus, since the power supplying apparatus enters a cutoff mode only after the set 16 completes the intrinsic function, the set 16 is stably operable. Thus, if the set 16 is an inkjet printer, a head is parked in the normal mode and then the supply of main power is cut off. As a result, ink discharged from the head is prevented from being coagulated.

If it is determined that main power needs to be saved, auxiliary power is supplied to the set 16 while the supply of main power to the set 16 is cut off in operation 46. For example, if the main power generator 10 senses that power supplied to the set 16 needs to be saved, using the control signal input from the set 16, the main power generator 10 does not supply main power to the set 16. However, the supply of auxiliary power from the auxiliary power generator 12 to the set 16 is not affected.

The set 16 determines whether a second predetermined period has passed starting from the time when the set 16 does not perform the intrinsic function and outputs the determined result as a control signal to the main power generator 10. The main power generator 10 senses that power supplied to the set 16 needs to be saved if it senses that the second predetermined period has passed using the control signal input from the set 16. Thus, the power supplying apparatus 14 goes from the normal mode into the power saving mode. The reason why auxiliary power is supplied to the set 16 in the power saving mode when main power is not supplied to the set 16 is to prepare the set 16 for performance of the intrinsic function, i.e., to allow the set 16 to perform only minimum necessary operations.

The power supplying apparatus 14 returns from the power saving mode to the normal mode or goes into the cutoff mode in operations 48, 52, and 54.

After operation 46, it is determined whether main power is requested to be re-supplied to the set 16 in operation 48. To perform operation 48, the main power generator 10 determines whether the set 16 requests main power, using the control signal input from the set 16.

If it is determined that the re-supplying of main power to the set 16 is requested, main power is re-supplied to the set 16 in operation 50 and operation 36 is repeated. In other words, the main power generator 10 generates main power and outputs the main power to the set 16 if the main power generator 10 senses that the set 16 requests the re-supply of main power, using the control signal input from the set 16. The set 16 outputs the control signal for requesting the re-supplying of main power to the main power generator 10 when the set 16 receives a command signal for commanding the performance of the intrinsic function of the set 16. Thus, the power supplying apparatus 14 shown in FIG. 1 returns from the power saving mode to the normal mode.

However, if it is determined that the re-supply of main power to the set 16 is not requested, the auxiliary power generator 12 determines whether the user wants to cut off the supply of auxiliary power to the set 16, using the power cutoff signal input via the input node IN2 in operation 52. If the auxiliary power generator 12 determines that the user does not want to cut off the supply of auxiliary power to the set 16, the power saving mode is maintained and performs operation 48 again. Thus, the power supplying apparatus 14 maintains the power saving mode while operations 48 and 52 are repeated.

The supply of auxiliary power to the set 16 is cut off in operation 54 if the auxiliary power generator 12 determines that the user wants to cut the supply of auxiliary power to the set 16, using the power cutoff signal input via the input node IN2. Thus, the power supplying apparatus 14 goes from the power saving mode into the cutoff mode.

The state of the power supplying apparatus of FIG. 1 operated according to the previously described power supplying method of the present invention, the power cutoff signal, the control signal, and the generation or nongeneration of main power and auxiliary power are summarized in Table 1 below.

TABLE 1

| Mode | Power Cutoff Signal | | Control Signal | Main Power | Auxiliary Power |
|---|---|---|---|---|---|
| Normal Power Saving | ON | | H L | Generation Nongeneration | Generation |
| Power Saving Normal | ON | | L H | Nongeneration Generation | Generation |
| Power Saving Cutoff | ON | OFF | Main-tenance of L | Nongeneration | Generation Nongeneration |
| Cutoff Normal | OFF | ON | L H | Nongeneration Generation | Nongeneration Generation |
| Normal Cutoff | ON | OFF | H L | Generation after pre-determined time Nongeneration | Generation Nongeneration |

In Table 1, the power cutoff signal in a "ON" state represents the user wanting auxiliary power to be supplied to the set 16, and the cutoff signal in a "OFF" state represents the user not wanting main and auxiliary powers to be supplied to the set 16. The control signal in a "H" state represents the set 16 wanting main power to be supplied from the power supplying apparatus 14, and the control signal in a "L" state represents the set 16 informing the power supplying apparatus 14 that the second predetermined period has passed.

The main power generator 10 and the auxiliary power generator 12 shown in FIG. 1 may generate main power and auxiliary power, respectively, in a switching mode. In other words, the power supplying apparatus 14 shown in FIG. 1 may be a switching mode power supplier (SMPS).

A configuration and an operation of a power supplying apparatus according to the present invention, which generates power in a switching mode, will be described with reference to FIG. 3.

Figure 3:
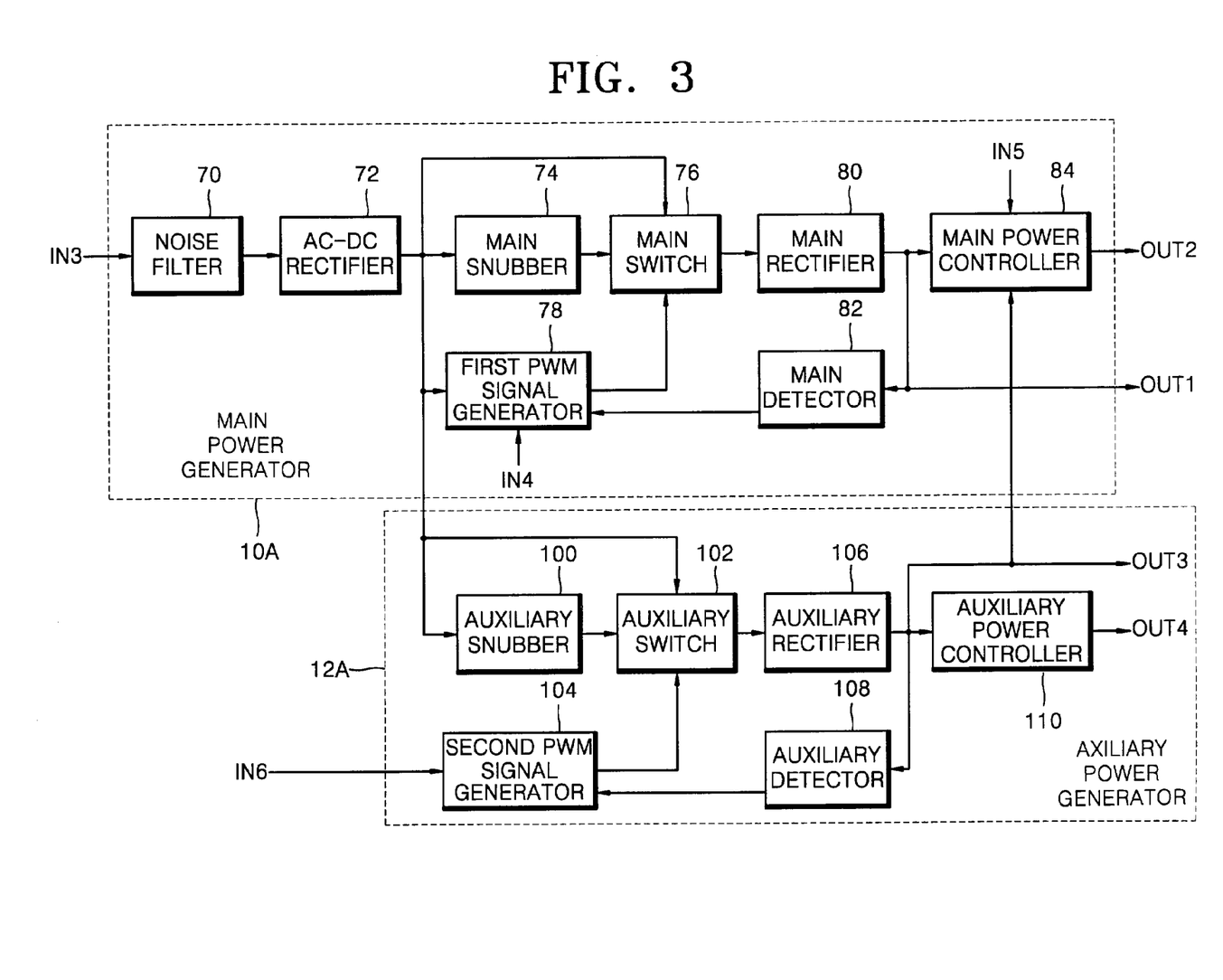
FIG. 3 is a block diagram of another embodiment of the power supplying apparatus having a power saving function.

FIG. 3 is a block diagram of an embodiment of the power supplying apparatus shown in FIG. 1, which is implemented in the switching mode. The power supplying apparatus of FIG. 3 includes a main power generator 10A and an auxiliary power generator 12A.

The main power generator 10A comprises a noise filter 70, an alternating current-direct current (AC-DC) rectifier 72, a main snubber 74, a main switch 76, a first pulse width modulation (PWM) signal generator 78, a main rectifier 80, a main detector 82, and a main power controller 84.

The noise filter 70 filters electromagnetic interface (EMI) and surge noise from a rated AC voltage input via an input node IN3 from the outside and outputs the filtered AC voltage to the AC-DC rectifier 72. The AC-DC rectifier 72 rectifies the filtered AC voltage to generate a DC voltage and the main snubber 74 minimizes a first spike voltage. The first spike voltage is generated when the main switch 76 switches the DC voltage rectified in the AC-DC rectifier 72.

The main switch 76 switches the DC voltage input from the AC-DC rectifier 72 in response to a first PWM signal input from the first PWM signal generator 78 and outputs the switched voltage as a square wave to the main rectifier 80. The first PWM signal generator 78 senses whether auxiliary power is generated and whether the main power controller 84 emits light, and generates the first PWM signal, whose pulse width is modulated according to the strength of main power input from the main detector 82, in response to the sensed results, and outputs the first PWM signal to the main switch 76. The main rectifier 80 rectifies the square wave voltage input from the main switch 76 and outputs the rectified result as main power to the set 16 via an output node OUT1.

The main detector 82 detects the strength of main power input from the main rectifier 80 and outputs the detected strength of the main power to the first PWM signal generator 78. The main power controller 84 is driven by auxiliary power input from the auxiliary power generator 12A or main power input from the main rectifier 80 and emits light via an output node OUT 2 in response to a control signal input from the set 16 via an input node IN5. The first PWM signal generator 78 receives light, which is emitted from the main power controller 84 via the output node OUT2, via an input node IN4 to sense whether the main power controller 84 emits light.

The auxiliary power generator 12A shown in FIG. 3 comprises an auxiliary snubber 100, an auxiliary switch 102, a second PWM signal generator 104, an auxiliary rectifier 106, an auxiliary detector 108, and an auxiliary power controller 110.

The auxiliary snubber 100 of the auxiliary power generator 12A minimizes a second spike voltage. The second spike voltage is generated when the auxiliary switch 102 switches the DC voltage rectified in the AC-DC rectifier 72.

The auxiliary switch 102 switches the DC voltage input from the AC-DC rectifier 72 in response to a second PWM signal input from the second PWM signal generator 104 and outputs the switched voltage as a square wave to the auxiliary rectifier 106. The auxiliary rectifier 106 rectifies the square wave voltage input from the auxiliary switch 102 and outputs the rectified result as auxiliary power to the set 16 and to the main power controller 84 via an output node OUT3. The auxiliary detector 108 detects a strength of auxiliary power input from the auxiliary rectifier 106 and outputs the detected strength of the auxiliary power to the second PWM signal generator 104.

The second PWM signal generator 104 generates the second PWM signal, whose pulse width is modulated according to a strength of auxiliary power input from the auxiliary detector 108, in response to a power cutoff signal input via an input node IN6, and outputs the second PWM signal to the auxiliary switch 102. The second PWM signal generator 104 may include a switch (not shown) which is switched on or off in response to the power cutoff signal. In this case, the switch (not shown) is switched off when the power cutoff signal is in an "OFF" state, and thus the second PWM signal is not generated. Thus, the auxiliary switch 102 does not perform a switching operation and the square wave is not output to the auxiliary rectifier 106. As a result, auxiliary power is not output to the set 16. However, where the switch (not shown) is switched on, the power cutoff signal is in an "ON" state, and thus the second PWM is generated. Thus, the auxiliary switch 102 performs the switching operation and the square wave is output to the auxiliary rectifier 106. As a result, auxiliary power is output to the set 16 via the output node OUT3.

The auxiliary power controller 110 emits light via an output node OUT4 in response to the generation or non-generation of auxiliary power input from the auxiliary rectifier 106. In other words, the auxiliary power controller 110 emits light when the auxiliary rectifier 106 generates auxiliary power while the auxiliary power controller 110 does not emit light when the auxiliary rectifier 106 does not generate auxiliary power. The first PWM signal generator 78 receives light emitted from the auxiliary power controller 110 via the output node OUT4 via the input node IN4 to sense the generation of auxiliary power.

Figure 4:
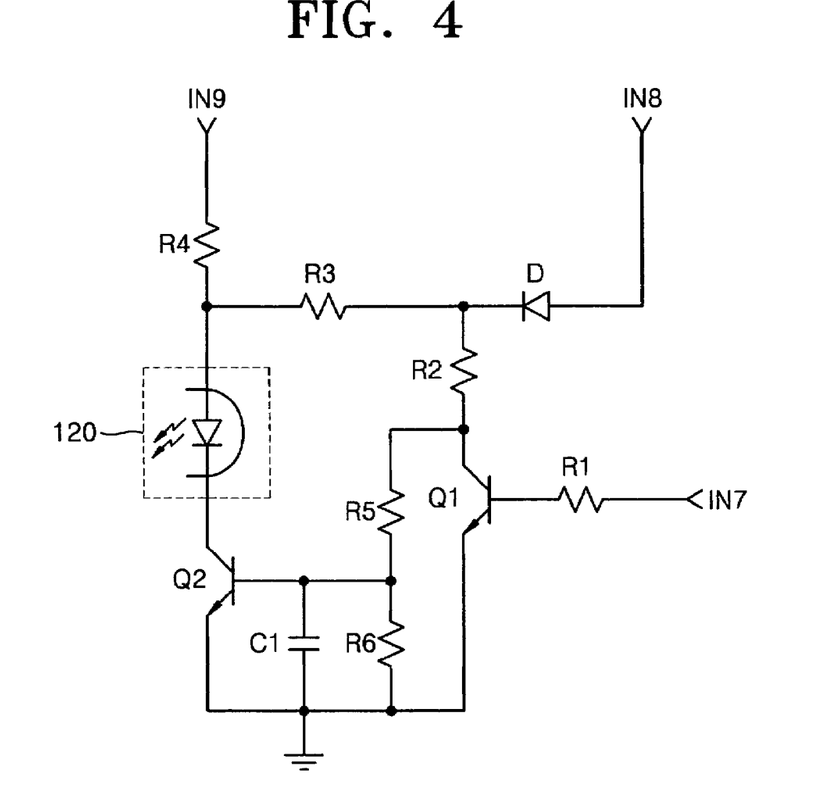
FIG. 4 is a circuit diagram of an embodiment of a main power controller of the power supplying apparatus shown in FIG. 3.

FIG. 4 is a circuit diagram of an embodiment of the main power controller 84 shown in FIG. 3. The main power controller comprises first through sixth resistances R1 through R6, respectively, a first capacitor C1, a diode D, first and second transistors Q1 and Q2, respectively, and a first light emitting diode (LED) 120.

The first resistance R1 is connected between a control signal input from the set 16 via an input node IN7 and a base of the first transistor Q1. The diode D has an anode connected to auxiliary power input from the auxiliary power generator 12A via an input node IN8 and a cathode connected to one side of the second resistance R2. The second resistance R2 is connected between the cathode of the diode D and a collector of the first transistor Q1. The first transistor Q1 has the base connected to one side of the first resistance R1, the collector and an emitter respectively connected to the other side of the resistance R2 and ground, which is a reference potential.

The third and fourth resistances R3 and R4 are connected in series between the cathode of the diode D and main power input from the main rectifier 80 via an input node IN9. The fifth and sixth resistances R5 and R6 are connected in series between the collector of the first transistor Q1 and the reference potential. The first capacitor C1 is connected between a connection point of the fifth and sixth resistances R5 and R6 and ground. The second transistor Q2 has a base connected to the connection point of the fifth and sixth resistances R5 and R6 and an emitter connected to ground. The first LED 120 is connected between a connection point of the third and fourth resistances R3 and R4 and the collector of the second transistor Q2.

The main power controller having the above-described configuration shown in FIG. 4 is driven by auxiliary power input from the auxiliary power generator 12A via the input node IN8 and/or main power input from the main rectifier 80 via the input node IN9 and allows the first LED 120 to emit light in response to a control signal input via the input node IN7. Thus, the first PWM signal generator 78 receives light emitted from the first LED 120 via an input node IN4 to sense the generation of main power. In other words, if the first PWM signal generator 78 receives light emitted from the first LED 120 via the input node IN4, the first PWM signal generator 78 senses that main power is generated.

Figure 5:
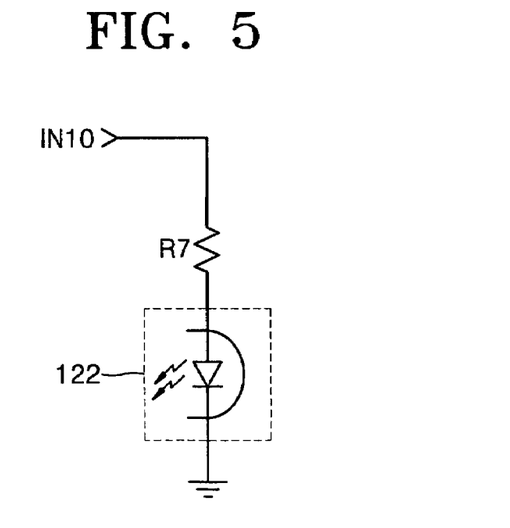
FIG. 5 is a circuit diagram of an embodiment of an auxiliary power controller of the power supplying apparatus shown in FIG. 3.

FIG. 5 is a circuit diagram of an embodiment of the auxiliary power controller 110 shown in FIG. 3. The auxiliary power controller 110 comprises a seventh resistance R7 and a second LED 122.

Referring to FIG. 5, the seventh resistance R7 has one side connected to auxiliary power input from the auxiliary rectifier 106 via an input node IN10. The second LED 122 is connected between the other side of the seventh resistance R7 and ground.

The auxiliary power controller 110 having the above-described configuration shown in FIG. 5 allows the second LED 122 to emit light if the auxiliary power controller 110 receives auxiliary power from the auxiliary rectifier 106 via the input node IN10. Thus, the first PWM signal generator 78 receives light emitted from the second LED 122 via the input node IN4 to sense the generation of auxiliary power. In other words, the first PWM signal generator 78 senses that auxiliary power is generated if the first PWM signal generator 78 receives via the input node IN4 light emitted from the second LED 122.

Figure 6:
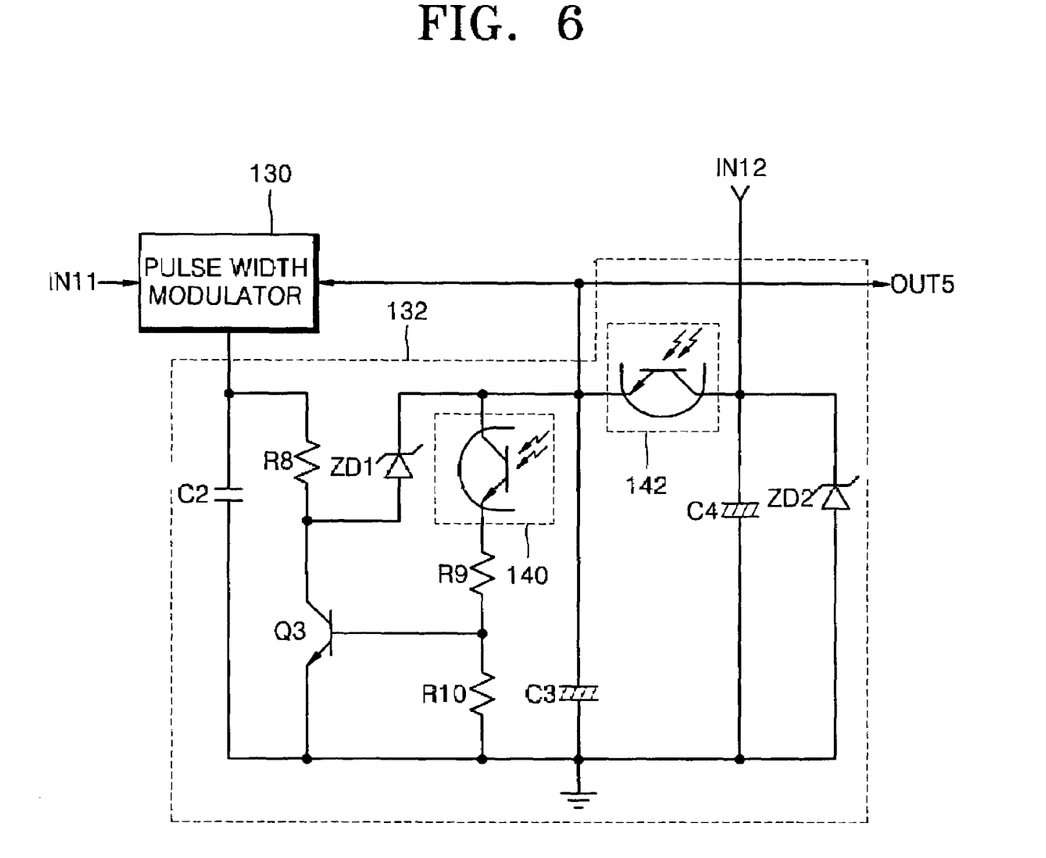
FIG. 6 is a circuit diagram of an embodiment of a first pulse width modulation signal generator of the power supplying apparatus shown in FIG. 3.

FIG. 6 is a circuit diagram of an embodiment of the first PWM signal generator 78 shown in FIG. 3. The PWM signal generator 78 comprises a pulse width modulator 130 and a driver 132.

The pulse width modulator 130 shown in FIG. 6 is driven by the driver 132, generates a first PWM signal according to the strength of main power input from the main detector 82 via an input node IN11, and outputs the first PWM signal to the main switch 76 via an output node OUT5.

The driver 132 senses whether auxiliary power and main power are generated and drives the pulse width modulator 130 in response to the sensed results. The driver 132 comprises eighth, ninth, and tenth resistances R8, R9, and R10, respectively, second, third, and fourth capacitors C2, C3, and C4, respectively, a third transistor Q3, first and second Zener diodes ZD1 and ZD2, respectively, and first and second light receiving transistors 140 and 142, respectively.

Referring to FIG. 6, the first light receiving transistor 140 has a base which receives light emitted from the first LED 120 shown in FIG. 4, a collector connected to a cathode of the first Zener diode ZD1 and an emitter connected to one side of the ninth resistance R9. The first Zener diode ZD1 has the cathode connected to the collector of the first light receiving transistor 140 and an anode connected to a collector of the third transistor Q3. The third transistor Q3 has the collector and an emitter, which are connected respectively to the anode of the first Zener diode ZD 1 and ground. The eighth resistance R8 is connected between the anode of the first Zener diode ZD1 and the pulse width modulator 130. The second capacitor C2 is connected between the pulse width modulator 130 and ground. The ninth resistance R9 is connected between the emitter of the first light receiving transistor 140 and a base of the third transistor Q3. The tenth resistance R10 is connected between the base of the third transistor Q3 and ground.

The second light receiving transistor 142 has a base for receiving light emitted from the second LED 122 shown in FIG. 5 and a collector connected to a DC voltage input from the AC-DC rectifier 72 via an input node IN12. The third capacitor C3 is an electrolytic capacitor which is connected between the emitter of the second light receiving transistor 142 and ground. The fourth capacitor C4 is an electrolytic capacitor which is connected between the collector of the second light receiving transistor 142 and ground. The second Zener diode ZD2 is connected in parallel with the fourth capacitor C4, and the pulse width modulator 130 is driven in response to voltages charged in the second and third capacitors C2 and C3, respectively.

The operation of the first PWM signal generator 78 having the above-described configuration shown in FIG. 6 will be described together with the operations of the main power controller and the auxiliary power controller shown in FIGS. 4 and 5.

Suppose that auxiliary power and main power are input via the input nodes IN8 and IN9, respectively, as shown in FIG. 4. The first transistor Q1 is turned on and the second transistor Q2 is turned off if a control signal in logic "high" (which corresponds to the previously-described "H") is input from the set 16 via the input node IN7. As a result, the first LED 120 does not emit light. Thus, the first light receiving transistor 140 of FIG. 6, which receives light emitted from the first LED 120, is turned off and thus the level of a voltage charged in the second capacitor C2 is maintained to a predetermined level, e.g., 0.5 volt or more. If the level of the voltage charged in the second capacitor C2 is above a predetermined level, the pulse width modulator 130 outputs a first PWM signal to the main switch 76 via the output node OUT5. However, the first transistor Q1 is turned off and the second transistor is turned on if a control signal in logic "low" (which corresponds to the previously-described "L") is input from the set 16 via the input node IN7. As a result, the first LED 120 emits light. Thus, the first light receiving transistor 140 of FIG. 6, which receives light emitted from the first LED 120, is turned on, and thus the level of the voltage charged in the second capacitor C2 becomes lower than the predetermined level. If the level of the voltage charged in the second capacitor C2 becomes lower than the predetermined level, the pulse width modulator 130 does not output the first PWM signal to the main switch 76 via the output node OUT5.

Suppose that the first light receiving transistor 140 is turned off. The second LED 122 does not emit light if auxiliary power is not input from the auxiliary rectifier 106 via the input node IN10. As a result, the second light receiving transistor 142 shown in FIG. 6 is turned off. Thus, a DC voltage cannot be supplied to the pulse width modulator 130 although the DC voltage is input from the AC-DC rectifier 72 via the input node IN12. Finally, the pulse width modulator 130, which is driven by the DC voltage output from the AC-DC rectifier 72, cannot generate the first PWM signal. However, the second LED 122 emits light if auxiliary power is input from the auxiliary rectifier 106 via the input node IN10 shown in FIG. 5. As a result, the second light receiving transistor 142 shown in FIG. 6 is turned on. Thus, the DC voltage input from the AC-DC rectifier 72 via the input node IN12 is supplied to the pulse width modulator 130 via the second light receiving transistor 142 which is turned on. In this case, the pulse width modulator 130 is driven in response to the DC voltage input from the auxiliary rectifier 106 via the input node IN12 and generates the first PWM signal.

The main switch 76 shown in FIG. 3 does not perform a switching operation if the first PWM signal is not generated via the output node OUT5 of the first PWM signal generator of FIG. 6. Thus, the main power generator 10A cannot generate main power. Also, the main switch 76 performs the switching operation if the first PWM signal is generated via the output node OUT5 of the first PWM signal generator. Thus, the main power generator 10A generates main power.

The pulse width modulator 130 shown in FIG. 6 generates the first PWM signal depending on whether the second light receiving transistor 140 is turned on or off in case the second LED 122 does not emit light because auxiliary power is not generated after the second light receiving transistor 142 is turned on. In other words, the pulse width modulator 130 does not generate the first PWM signal when the first light receiving transistor 140 is turned on but does generate the first PWM signal when the first light receiving transistor 140 is turned off, although the second LED 122 does not emit light after the second light receiving transistor 142 is turned on.

Accordingly, the second light receiving transistor 142 shown in FIG. 6 allows the main power generator 10 or 10A shown in FIG. 1 or 3 to operate in response to operation of the auxiliary power generator 12 or 12A. In other words, the main power generator 10 or 10A generates main power in response to a control signal only if the auxiliary power generator 12 or 12A generates auxiliary power. Thus, the main power generator 10 or 10A cannot generate main power regardless of the control signal if the auxiliary power generator 12 or 12A does not generate auxiliary power.

As described above, a power supplying apparatus and a power supplying method having a power saving function according to the present invention controls the supply of power to a set 16 without the assistance of an AC switch. Thus, the set, which is supplied with only auxiliary power in a power saving mode, may communicate with another peripheral circuit and control the supply of power to the set 16 without the assistance of a conventional software unit requiring an additional power source. As a result, more power supplied to the set 16 is saved, and the supply of power to the set 16 is completely cut off after the set 16 completes the intrinsic function and/or returns to an initial state. Thus, the breakdown, malfunction, and problems of the set caused by the sudden cutoff of the supply of power due to a conventional AC switching are preventable, and the set 16 stably performs the intrinsic function.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus having a power saving function, for supplying power to a set which performs an intrinsic function, the apparatus comprising:
   an auxiliary power generator which generates auxiliary power for the set in response to a power cutoff ON signal; and
   a main power generator which senses the generation of the auxiliary power and generates main power in response to the sensed generation of the auxiliary power and a control signal supplied by the set based on an operational state of the set and the set performs the intrinsic function when the control signal indicates a change from a power saving mode or a cutoff mode to a normal mode,
   wherein, when the control signal indicates a change from the normal mode or the power saving mode to the cutoff mode and a predetermined period has passed, a power cutoff OFF signal is supplied to cut off the generation of the auxiliary power and the main power, and absent the power cutoff OFF signal, the set performs the intrinsic function in response to the main power and stands by to perform the intrinsic function in response to the auxiliary power.

2. The apparatus of claim 1, wherein the set is an electrical/electronic equipment which is supplied with power via a switch mode power supplier.

3. The apparatus of claim 2, wherein the intrinsic function is printing.

4. The apparatus of claim 2, wherein the intrinsic function is data transmitting and receiving.

5. The apparatus of claim 2, wherein the intrinsic function is digital copying.

6. The apparatus of claim 2, wherein the intrinsic function is a combination of printing, data transmitting and receiving, and digital copying.

7. The apparatus of claim 1, wherein the main power is generated in response to the sensed result of the generation of the auxiliary power and whether the set completes the intrinsic function.

8. The apparatus of claim 1, wherein the main power generator and the auxiliary power generator generate the main power and the auxiliary power, respectively, in a switching mode.

9. The apparatus of claim 8, wherein the main power generator comprises a main power controller which emits light in response to the control signal and one of the auxiliary power and the main power,
   wherein the main power is generated depending on whether the main power controller emits the light when the auxiliary power is generated.

10. The apparatus of claim 9, wherein the main power controller comprises:
    a first resistance having one side connected to the control signal;
    a diode having an anode connected to the auxiliary power;
    a second resistance having one side connected to a cathode of the diode;
    a first transistor having a base connected to another side of the first resistance, a collector connected to another side of the second resistance and an emitter connected to a reference potential;
    third and fourth resistances connected in series between the cathode of the diode and the main power;
    fifth and sixth resistances connected in series between the collector of the first transistor and the reference potential;
    a capacitor connected between a connection point of the fifth and sixth resistances and the reference potential;
    a second transistor having a base connected to the connection point of the fifth and sixth resistances and an emitter connected to the reference potential; and
    a light emitting diode connected between a connection point of the third and fourth resistances and a collector of the second transistor.

11. The apparatus of claim 9, wherein the main power generator further comprises a first pulse width modulation signal generator which senses whether the auxiliary power is generated and the main power controller emits light and generates a first pulse width modulation signal, whose pulse width is modulated according to a strength of the main power, in response to the sensed generation of the auxiliary power and emitted light of the main power controller, wherein the main power is generated depending on whether the first pulse width modulation signal is generated.

12. The apparatus of claim 11, wherein the first pulse width modulation signal generator comprises:
a pulse width modulator which generates the first pulse width modulation signal according to the strength of the main power; and
a driver which senses whether the auxiliary power is generated and the main power controller emits light and drives the pulse width modulator in response to the sensed results.

13. The apparatus of claim 12, wherein the main power generator further comprises:
a noise filter which filters electromagnetic interface and surge noises from a rated alternating current input voltage;
an alternating current-direct current rectifier which rectifies the filtered alternating current input voltage to output a direct current voltage;
a main switch which switches the direct current voltage in response to the first pulse width modulation signal to output a square wave voltage;
a main rectifier which rectifies the square wave voltage and outputs the rectified square wave voltage as the main power;
a main detector which detects the strength of the main power and outputs the detected strength to the first pulse width modulation signal generator; and
a main snubber which minimizes a first spike voltage which is generated when the main switch switches the direct current voltage output from the alternating current-direct current rectifier.

14. The apparatus of claim 13, wherein the auxiliary power generator comprises an auxiliary power controller which emits light depending on whether the auxiliary power is generated,
wherein the first pulse width modulation signal generator receives light emitted from the auxiliary power controller to sense the generation of the auxiliary power.

15. The apparatus of claim 14, wherein the auxiliary power controller comprises:
a resistance having one side connected to the auxiliary power; and
a light emitting diode connected between another side of the resistance and a-reference potential,
wherein the first pulse width modulation signal generator receives light emitted from the light emitting diode to sense the generation of the auxiliary power.

16. The apparatus of claim 10, wherein the main power generator further comprises a first pulse width modulation signal generator which senses whether the auxiliary power is generated and the main power controller emits light and generates a first pulse width modulation signal, whose pulse width is modulated according to a strength of the main power, in response to the sensed results,
wherein the main power is generated depending on whether the first pulse width modulation signal is generated.

17. The apparatus of claim 16, wherein the first pulse width modulation signal generator comprises:
a pulse width modulator which generates the first pulse width modulation signal according to the strength of the main power; and
a driver which senses whether the auxiliary power is generated and the main power controller emits light, and drives the pulse width modulator in response to the sensed results.

18. The apparatus of claim 17, wherein the main power generator further comprises:
a noise filter which filters electromagnetic interface and surge noises from a rated alternating current input voltage input;
an alternating current-direct current rectifier which rectifies the filtered alternating current voltage to generate a direct current voltage;
a main switch which switches the direct current voltage input from the alternating current-direct current rectifier in response to the first pulse width modulation signal to output a square wave voltage;
a main rectifier which rectifies the square wave voltage and outputs the rectified square wave voltage as the main power;
a main detector which detects the strength of the main power and outputs the detected strength to the first pulse width modulation signal generator; and
a main snubber which minimizes a first spike voltage which is generated when the main switch switches the direct current voltage rectified in the alternating current-direct current rectifier.

19. The apparatus of claim 18, wherein the auxiliary power generator comprises an auxiliary power controller which emits light depending on whether the auxiliary power is generated,
wherein the first pulse width modulation signal generator receives light emitted from the auxiliary power controller to sense the generation of the auxiliary power.

20. The apparatus of claim 19, wherein the auxiliary power controller comprises:
a seventh resistance having one side connected to the auxiliary power; and
a second light emitting diode connected between another side of the seventh resistance and the reference potential,
wherein the first pulse width modulation signal generator receives light emitted from the second light emitting diode to sense the generation of the auxiliary power.

21. The apparatus of claim 20, wherein the driver comprises:
a first light receiving transistor having a base which receives light emitted from the first light emitting diode;
a first Zener diode having a cathode connected to a collector of the first light receiving transistor;
a third transistor having a collector and an emitter respectively connected to an anode of the first Zener diode and the reference potential;
an eighth resistance having one side connected to the anode of the first Zener diode;
a second capacitor connected between another side of the eighth resistance and the reference potential;
a ninth resistance connected between an emitter of the first light receiving transistor and base of the third transistor;
a tenth resistance connected between the base of the third transistor and the reference potential;
a second light receiving transistor having a base which receives light emitted from the second light emitting diode and a collector connected to the direct current voltage output from the alternating current-direct current rectifier;

a third capacitor connected between an emitter of the second light receiving transistor and the reference potential;

a fourth capacitor connected between the collector of the second light receiving transistor and the reference potential; and a second Zener diode connected in parallel with the fourth capacitor, wherein the pulse width modulator is driven in response to voltages charged in the second and third capacitors.

22. The apparatus of claim 14, wherein the auxiliary power generator further comprises a second pulse width modulation signal generator which generates a second pulse width modulation signal, whose pulse width is modulated according to a strength of the auxiliary power, in response to the power cutoff signal.

23. The apparatus of claim 22, wherein the auxiliary power generator further comprises:

an auxiliary switch which switches the direct current voltage output from the alternating current-direct current rectifier in response to the second pulse width modulation signal to output a second square wave voltage;

an auxiliary rectifier which rectifies the second square wave voltage to output the rectified second square wave voltage as the auxiliary power;

an auxiliary detector which detects the strength of the auxiliary power input from the auxiliary rectifier and outputs the detected strength to the second pulse width modulation signal generator; and an auxiliary snubber which minimizes a second spike voltage which is generated when the auxiliary switch switches the direct current voltage rectified in the alternating current-direct current rectifier.

24. The apparatus of claim 1, wherein the set is a computer peripheral device.

25. An apparatus for saving power in a set which performs an intrinsic function, the apparatus comprising:

an auxiliary power generator which supplies auxiliary power to the set in response to a power cutoff ON signal;

a main power generator which supplies main power to the set in response to light and the set performs the intrinsic function when the main power generator changes from a power saving mode or a cutoff mode to a normal mode; and a light generator which emits the light in response to the auxiliary power, wherein if when a control signal indicates a change from the normal mode or the power saving mode to the cutoff mode, the light continues to be emitted for a predetermined time, followed by removal of the auxiliary power.

26. An apparatus for saving power in a set which performs an intrinsic function, the apparatus comprising:

an auxiliary power generator which supplies auxiliary power to the set in response to a power cutoff ON signal;

a main power generator which supplies main power to the set in response to light and the set performs the intrinsic function when the main power generator changes from a power saving mode or a cutoff mode to a normal mode and a light generator which emits the light where at least one of the main power and the auxiliary power is generated and a control signal is provided by the set indicating that if the normal mode or the power saving mode changes to the cutoff mode, the light continues to be emitted for a predetermined time, followed by removal of the auxiliary power.

27. The apparatus of claim 26, wherein:
the light continues to be emitted for a predetermined time after the intrinsic function is completed.

28. An apparatus for supplying power to a set, the apparatus comprising:

a first power generator which supplies power to the set; and a second power generator which supplies power to the set, the second power generator connected to the first power generator, wherein, in a power-saving mode, one of the first and second power generators cuts off the supply of power to the set in response to a first power cutoff signals, and, in a power cutoff mode, the remaining one of the first and second power generators cuts off the supply of power to the set in response to a second cower cutoff signal after the set completes an intrinsic function.

29. The apparatus of claim 28, wherein the one of the first and second power generators has a higher capacity than the other of the first and second power generators.

30. The apparatus of claim 28, wherein the second power generator cuts off the supply of power to the set earlier than the first power generator in response to the power cutoff signal.

31. The apparatus of claim 28, wherein a rated alternating current voltage is input to the first power generator.

32. The apparatus of claim 28, wherein the intrinsic function of the set is one of printing, data transmitting and receiving, and copying.

* * * * *

UNITED STATES PATENT AND TRADEMARK OFFICE
CERTIFICATE OF CORRECTION

PATENT NO. : 7,149,902 B2
APPLICATION NO. : 10/231473
DATED : December 12, 2006
INVENTOR(S) : Han-chung Ryu It is certified that error appears in the above-identified patent and that said Letters Patent is hereby corrected as shown below:

Column 12, Line 21, after "sensed" delete "result of the".

Column 13, Line 48, change "a-reference" to --a reference--.

Column 15, Line 48, after "if" insert --,--.

Column 16, Line 12, after "mode" insert --;--.

Column 16, Line 32, change "signals," to --signal,--.

Column 16, Line 35, change "cower" to --power--.

Signed and Sealed this

Eighth Day of May, 2007

JON W. DUDAS
*Director of the United States Patent and Trademark Office*